June 11, 1963 G. W. BAKER ET AL 3,092,941
CAPPING APPARATUS AND PROCEDURE
Filed April 12, 1960 11 Sheets-Sheet 1
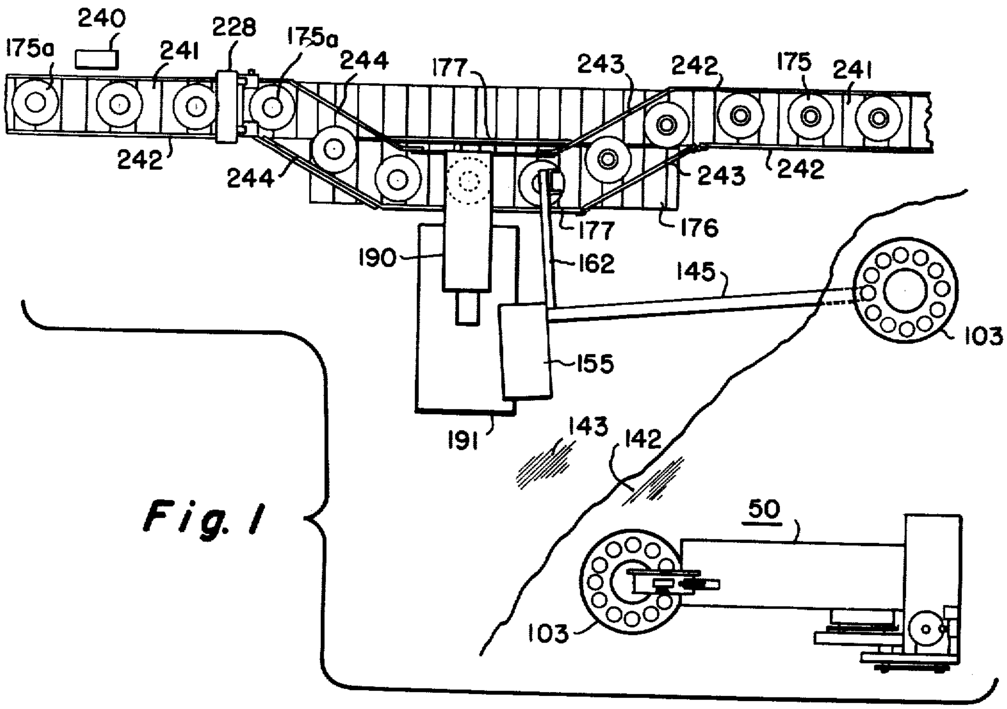
Fig. 1
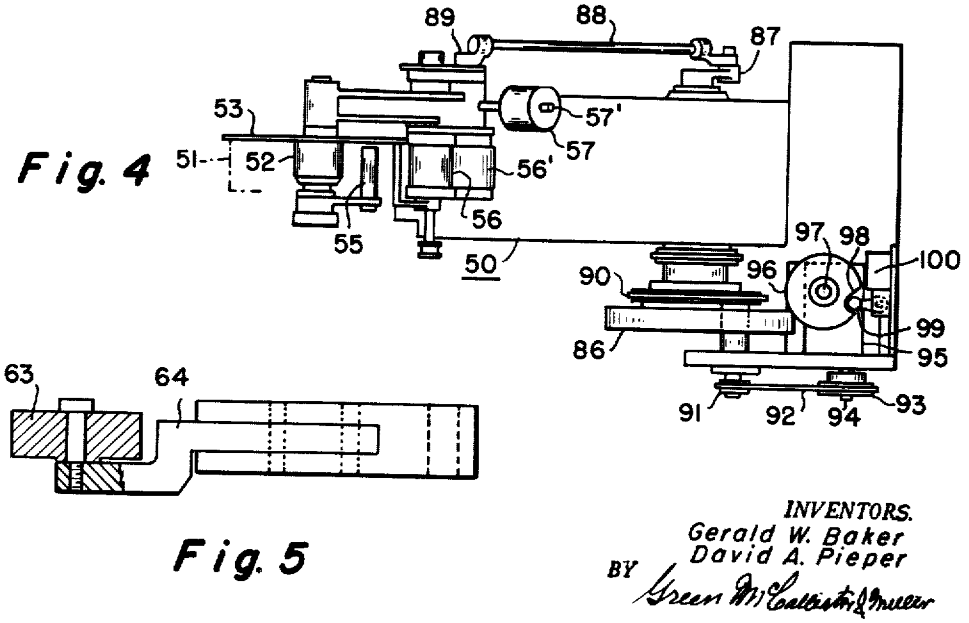
Fig. 4
Fig. 5
INVENTORS.
Gerald W. Baker
David A. Pieper
BY Green McCallister & Miller
THEIR ATTORNEYS June 11, 1963 G. W. BAKER ET AL 3,092,941

CAPPING APPARATUS AND PROCEDURE

Filed April 12, 1960 11 Sheets-Sheet 2

INVENTORS.
Gerald W. Baker
David A. Pieper
BY Green McCallister & Miller
THEIR ATTORNEYS June 11, 1963 G. W. BAKER ET AL 3,092,941

CAPPING APPARATUS AND PROCEDURE

Filed April 12. 1960

11 Sheets-Sheet 3

INVENTORS.
Gerald W. Baker
David A. Pieper
BY Green McCallister & Miller
THEIR ATTORNEYS INVENTORS.
Gerald W. Baker
David A. Pieper
BY Green, McCallister & Miller,
THEIR ATTORNEYS CAPPING APPARATUS AND PROCEDURE
Filed April 12. 1960
11 Sheets-Sheet 5
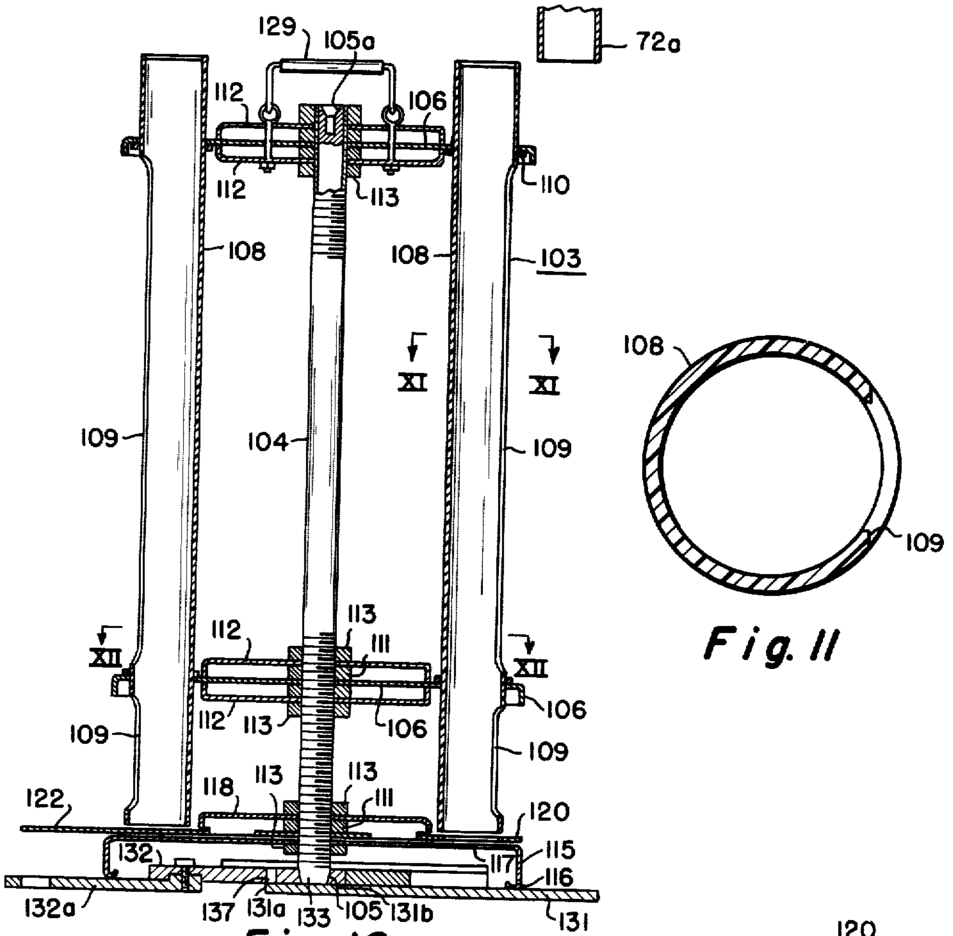
Fig. 10, Fig. 11
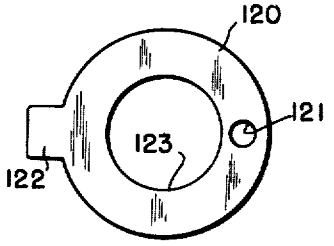
Fig. 13
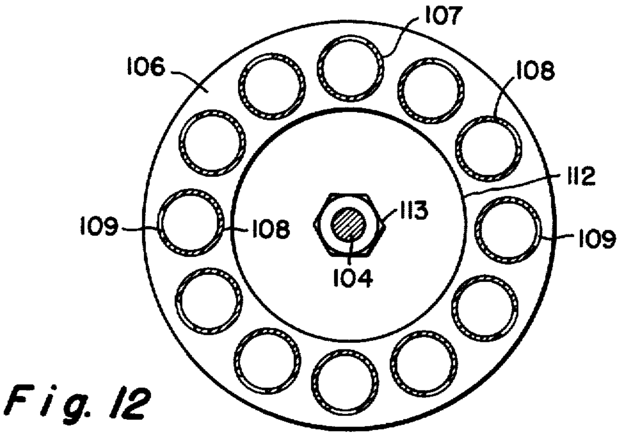
INVENTORS.
Gerald W. Baker
David A. Pieper
BY Green McCallister & Miller
THEIR ATTORNEYS

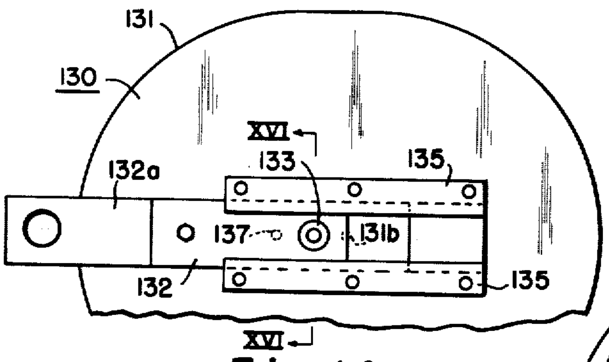
Fig. 14
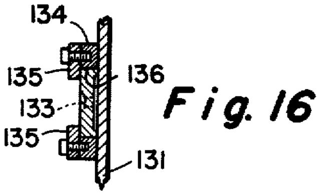
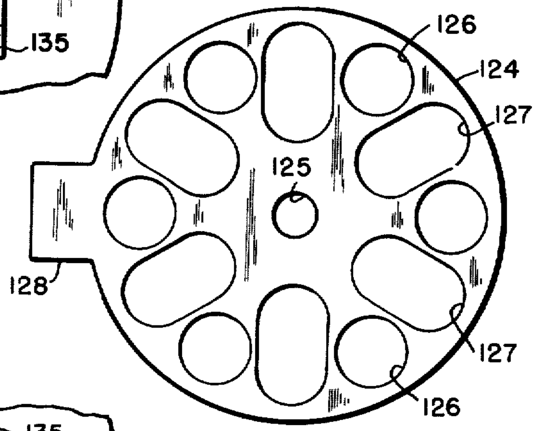
Fig. 18
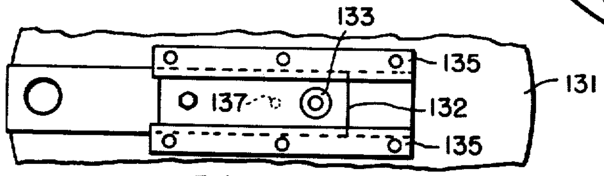
Fig. 15
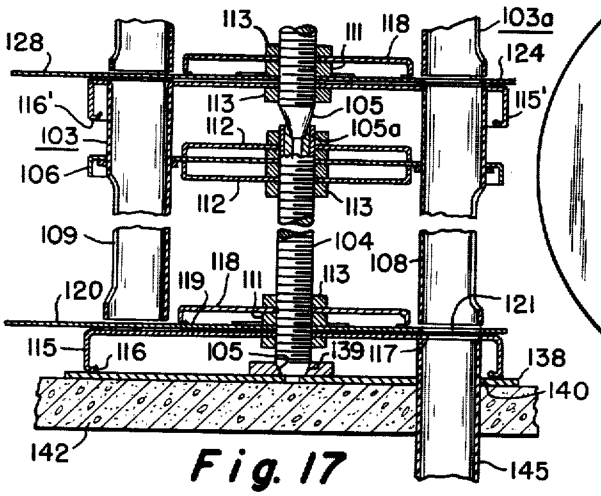
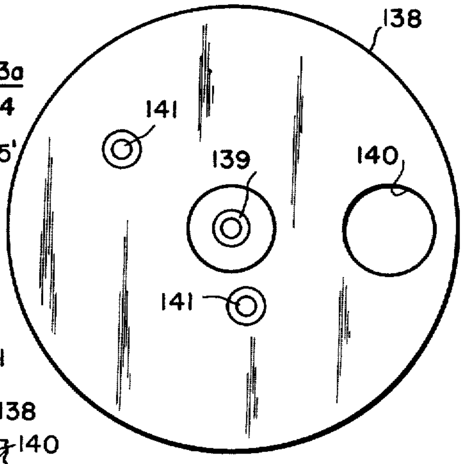
Fig. 19
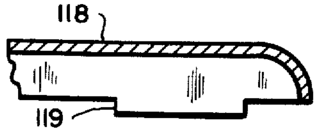
Fig. 20
INVENTORS.
Gerald W. Baker
David A. Pieper
BY Green McCallister & Miller,
THEIR ATTORNEYS INVENTORS.
Gerald W. Baker
David A. Pieper
BY Green McCallister & Miller
THEIR ATTORNEYS June 11, 1963 G. W. BAKER ET AL 3,092,941

CAPPING APPARATUS AND PROCEDURE

Filed April 12, 1960 11 Sheets-Sheet 8

INVENTOR.
Gerald W. Baker
David A. Pieper
BY Green McCallister & Miller
THEIR ATTORNEYS INVENTORS.
Gerald W. Baker
David A. Pieper
BY Green, McCallister & Miller,
THEIR ATTORNEYS INVENTORS.
Gerald W. Baker
David A. Pieper
BY Green McCallister & Miller
THEIR ATTORNEYS INVENTORS.
Gerald W. Baker
David A. Pieper
BY Green McCallister & Miller
THEIR ATTORNEYS 3,092,941

CAPPING APPARATUS AND PROCEDURE

Gerald W. Baker and David A. Pieper, Muncie, Ind., assignors to Ball Brothers Company, Incorporated, Muncie, Ind., a corporation of Indiana
Filed Apr. 12, 1960, Ser. No. 21,628
34 Claims. (Cl. 53—41)

This invention relates to improved apparatus and procedure for forming and applying closure members to containers, and more particularly to apparatus and procedure for forming and applying temporary closures to glass containers.

In the glass industry, it is customary for manufacturers of glass containers to stock the same until released for shipment. Although the containers are crated and stored in closed-top cartons, each container is open, viz., uncapped, although packed with others in a crate or carton. As a result the interiors of the containers are subject to contamination, and the packager who eventually utilizes the containers for food stuff, must first sterilize each container before filling it with food stuff. Such sterilization operations are not only time-consuming, but also increase the cost of the food packing operation.

Since newly formed and annealed glassware is in a sterile condition as it leaves the annealing lehr, we have provided novel procedure temporarily capping the new sterile ware, so that it may be stored and shipped to a packager in its sterile condition, thus eliminating the necessity of sterilizing the shipped ware. As a result, the containers, when received by a food packager may be readily uncapped and immediately filled with his food stuff, thus resulting in a saving both of time and expense.

Our improved system includes a blanking machine for forming and stacking a plurality of closure members (hereinafter termed caps) within storage magazines. The magazines are such that a plurality of them may be positioned above, and in open communication with a cap dispensing device. The cap dispensing device may then be positioned adjacent a moving row of conveyor-moved, newly formed, and annealed containers so that a cap may be withdrawn from the magazine and positioned on the open top of each container as it continues its movement past the magazine. The containers are then transported on the continuously moving conveyor to a capping machine where each cap is secured to the mouth of the container. The container is then transported to an inspection station wherein a photocell controlled mechanism actuates a warning signal if a container is not equipped with a cap, i.e., a cap located in proper position over the mouth of the container.

It thus has been an object of the invention to provide a method of and apparatus for economically sealing newly formed and sterile containers with temporary closures;

A further object of the invention has been to provide an improved mechanism for automatically forming and stacking a plurality of caps in portable storage magazines;

A further object of the invention has been to provide means for stacking and simultaneously feeding a plurality of caps to a cap-dispensing device;

An additional object is to provide procedure for positioning caps on successively presented open top containers, and to seal the caps on the containers;

A still further object is to provide an automatic inspection system for the continuously moving containers which indicates the absence of a cap from a moving container;

These and other objects of the invention will be apparent to those skilled in the art from the following description and accompanying drawings in which:

FIGURE 1 is a schematic plan view of our improved capping means for containers;

FIGURE 4 is a top plan view of the blanking unit, shown in FIGURE 3;

FIGURE 5 is a detailed plan view, partly in section, of a contact roller assembly utilized with the blanking unit;

FIGURE 10 is a vertical sectional view of a magazine assembly device forming a detail of the invention;

FIGURE 11 is a sectional view taken along lines XI—XI of FIGURE 10;

FIGURE 12 is a sectional view taken along lines XII—XII of FIGURE 10;

FIGURE 13 is a plan view of a stop plate forming a part of the apparatus illustrated in FIGURE 10;

FIGURE 14 is a fragmental plan view of a slide assembly shown in an outward position, which assembly is utilized for moving cap-receiving magazine assembly into and out of communication with the collecting chutes shown in FIGURES 6 and 7;

FIGURE 15 is a fragmental plan view of the slide assembly of FIGURE 14, but shown in an inward position;

FIGURE 16 is a sectional view taken along lines XVI—XVI of FIGURE 14;

FIGURE 17 is a fragmental vertical sectional view illustrating the positioning of a plurality of assembled magazines, such as are schematically shown in FIGURE 2;

FIGURE 18 is a plan view of a retainer disc for opening and closing the tubes of the magazines;

FIGURE 19 is a plan view of a base plate for centering the assembled magazines of FIGURE 17 above a feed tube leading to a dispensing device;

FIGURE 20 is an enlarged fragmental view in elevation illustrating tabs extending downwardly from a bottom disc reinforcement plate shown in FIGURES 10 and 17;

The invention involves correlated apparatus and procedure for forming a special type of closure caps and then applying the caps to newly formed containers in order to prevent contamination of the interiors of the containers. The caps are of a type that may be readily and quickly produced and then mechanically applied to containers, such as glass jars, in such a way that the caps may be readily removed from the jars preliminary to filling them with food or other material.

Figure 2:
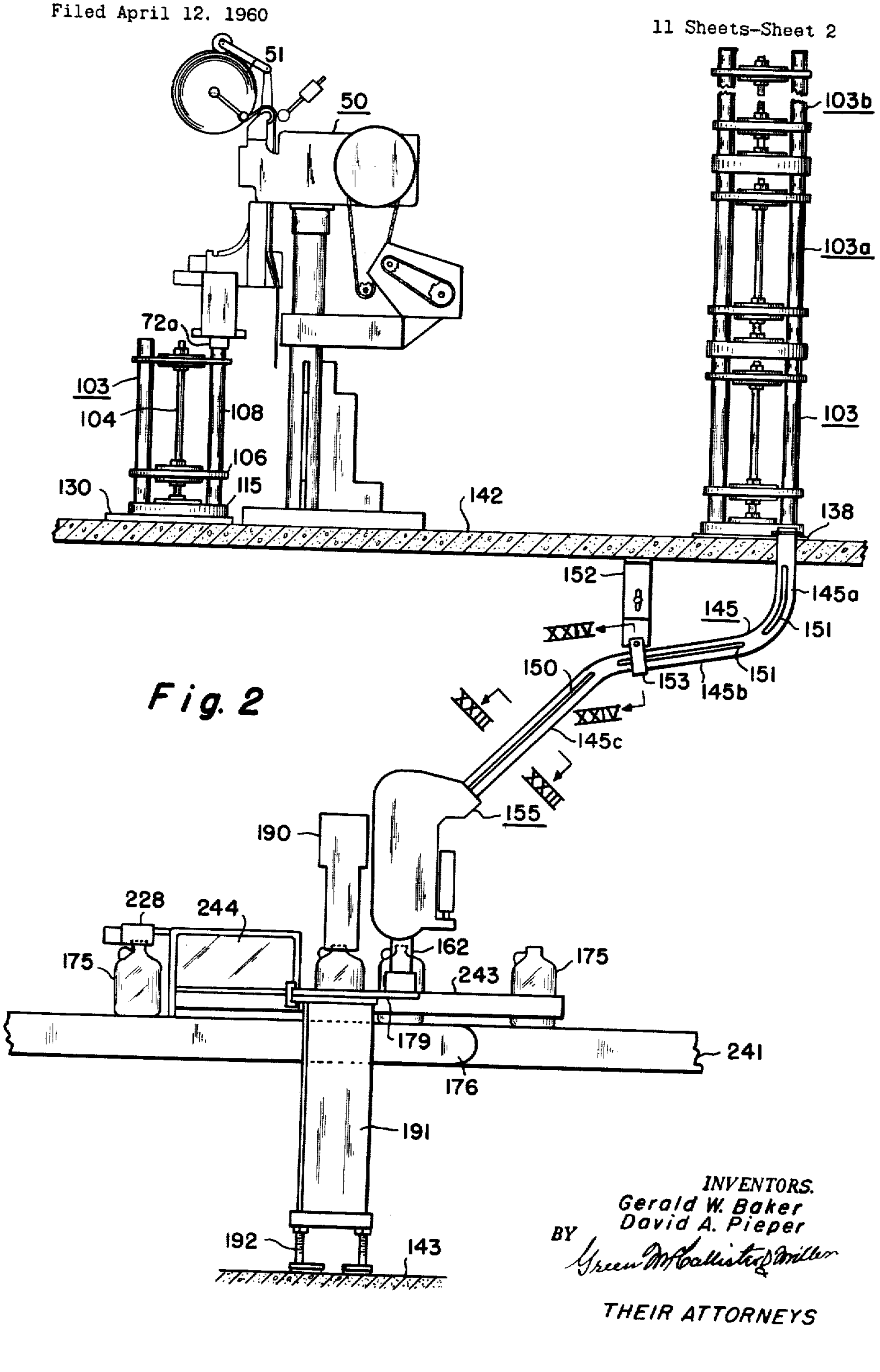
FIGURE 2 is a schematic elevational view of container-capping apparatus forming an embodiment of the invention.

Referring to the drawings, and particularly to the schematic diagrams of FIGURES 1 and 2, a blanking machine 50, for forming caps, is shown positioned on an elevated floor, such as the floor 142 of a second story. A magazine 103 is so positioned under a discharge chute of the blanking machine that it receives caps as they are formed. A plurality of filled magazines 103, 103*a*, and 103*b* are shown positioned on the second floor 142 in a vertically stacked relationship, one above the other, so that the caps feed downwardly into and through a feed chute 145, to a separator and dispensing device 155 located on a lower or first floor 143. As shown in FIGURE 1, newly formed containers moving on a main conveyor 241, are deflected onto a secondary conveyor 176 by a deflector rail 243. The dispensing device 155 (FIGURE 2) has a dispensing chute 162 which directs individual caps downwardly to a position such that they are engaged by the neck finish of the successive containers 175 moving on the conveyor 176. As each such container moves past the dispensing chute 162, it contacts and extracts a cap 58 therefrom, so that the cap is loosely positioned on the neck finish over the mouth of the container 175.

The containers 175 then continue on conveyor 176 to a position adjacent a capping unit 190, which seals the loosely positioned caps on the containers. The capped containers 175*a* may then be deflected by guard rail 244 back to the main conveyor 241, where they are conveyed through an automatic cap inspection device 228. The inspecting device 228 automatically activates an indicator or alarm 240 to notify the operator when a container passes which is not capped. The capped containers 175*a* then move along main conveyor 241, between the guide rails 242, to a packing station (not shown).

Figure 3:
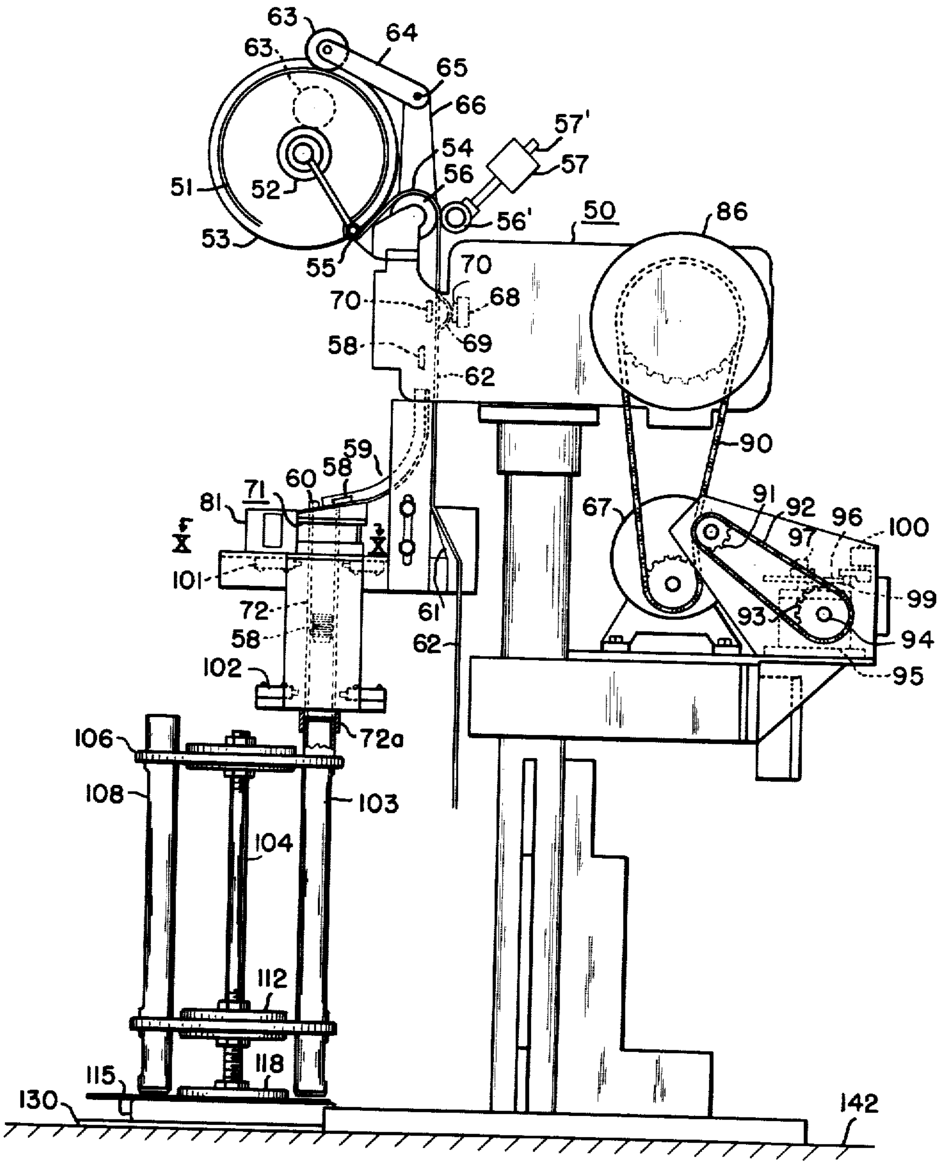
FIGURE 3 is a side elevational view partly in section, of a blanking unit for forming the cap, and means for collecting and stacking formed caps in a receiving and storage magazine.

The blanking unit 50 is more particularly set forth in FIGURES 3 through 9. As shown in FIGURE 3, the blanking machine 50 is provided with a roll 51, such as aluminum foil, mounted on an electrically insulated spool 52. The spool 52 has a disc-shaped backing guide 53 on one side thereof for positioning the roll 51 on the spool. A continuous strip 54 of the foil is directed over an idler guide roller 55, between feed rollers 56, 56' and downwardly into the blanking and forming dies of the blanking machine 50. A threaded rod 57' having an adjustable weight 57 is connected to the mounting of the roller 56'. The tension on the strip 54 may be varied by adjusting the position of the weight 57 on the rod 57'.

The strip 54 is fed through the blanking machine 50 where it is cut or blanked to form the caps 58. As the caps 58 are formed, they fall into a collecting chute 59 having a wide mouthed entrance 59*b* (FIGURE 6) at its upper end, and a discharge opening 59*c* at its lower end, communicating with a cap-receiving tube 60. The chute 59 has a rounded upper lip 59*a* along its rear edge for diverting and separating the scrap, i.e., the punched strip 62 from the formed caps 58. The punched strip 62 is fed downwardly to the rear of the chute 59 and is directed outwardly by a deflector plate 61 into a suitable container (not shown).

A metal contact roller 63, mounted on a pivoted arm 64, is adapted to ride on the foil roll 51 and forms an electrical contact therewith. The arm 64 is pivotally mounted at 65 on a support arm 66 which is secured to a body of the blanking machine 50. When the roll of foil 51 is depleted, the electrical contact between the contact roller 63 and the foil is broken because the contact roller 63 rides on the insulated spool 52 as shown by chain lines in FIGURE 3. This opens a low voltage control circuit and stops drive motor 67 which drives the blanking machine 50. The contact roller 63 therefore functions as a safety device by automatically stopping the blanking machine upon depletion of the aluminum foil roll 51.

A second automatic shut-off device is provided to stop the motor 67 of the blanking machine 50 if the aluminum strip 54 is crumpled or becomes buckled. A concave depression or recess 69 is formed adjacent the guideway for the strip 54 through the machine, and a relay 68 acts to break the circuit to the motor 67 if the foil strip contacts both of a pair of contact plates 70 which are positioned adjacent to and on opposite sides of the recess 69. Accordingly, if the aluminum foil 54 becomes buckled in the machine 50, it will stop the drive motor 67.

Figure 6:
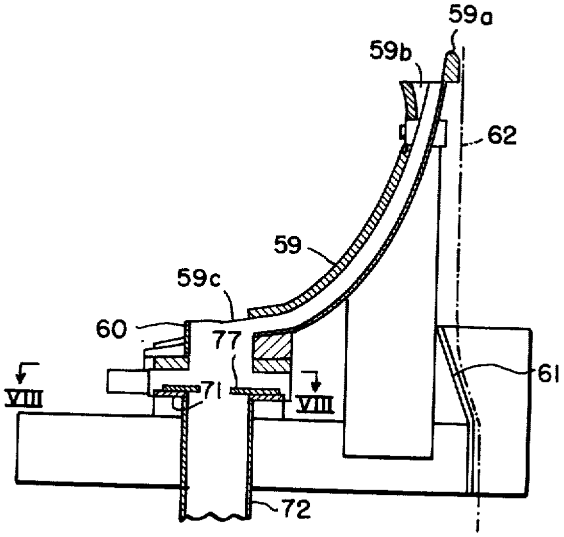
FIGURE 6 is a vertical elevational view of a cap receiving slide and collecting chute forming a part of the cap collecting mechanism illustrated in FIGURE 3.
Figure 7:
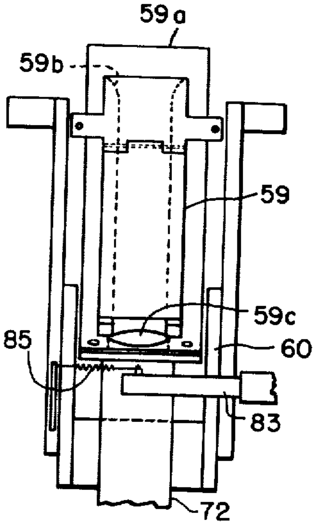
FIGURE 7 is a front elevation of the cap receiving and collecting mechanism illustrated in FIGURE 6.

An iris assembly 71 for collecting a predetermined number of caps 58, is located beneath the cap-receiving tube 60, and an aligned guide chute 72, also shown in FIGURE 6, extends downwardly below the iris assembly 71. A storage magazine 103, shown in FIGURES 2 and 3, is provided with a plurality of receiving and stacking or storage tubes 108, and is adapted to be positioned below the guide chute 72, with one of the tubes 108 in axial alignment with that chute. A vertically movable sleeve member 72*a*, slidably connected to the lower end of the guide chute 72, is adapted to telescope over the upper end of a tube 108 to provide a through connection therewith.

Since the caps 58 are extremely light ,they would have a tendency to flutter downwardly if they were allowed to fall freely through the guide chute 72 and into the stacking tubes 108. Such a fluttering of individual caps would tend to cause the caps to cock, jam or tilt, resulting in an uneven or haphazard stacking of the caps in the stacking tubes 108. In order to avoid this, we have provided an iris assembly 71 beneath the short cap-receiving tube 60 which is designed to block the passage of caps and collect a predetermined number of them within the tube 60 before allowing them to fall through the guide chute 72 and into a stacking tube 108. By collecting a group of caps and allowing them to fall as a unit, their combined weight is sufficient to cause the caps to fall straight downward through the chute 72 and into the stacking tube 108. The iris assembly 71 also aids in accomplishing an even stacking of the caps in the tubes 108.

Figures 8, 9:
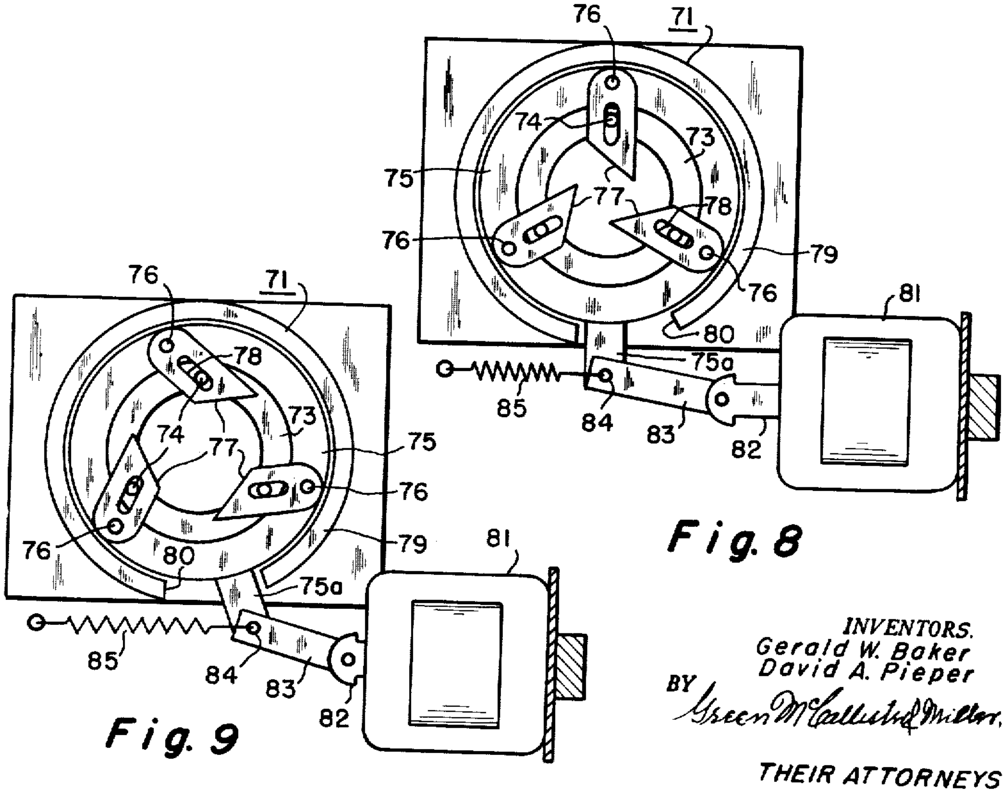
FIGURE 8 is a sectional view taken along lines X—X of FIGURE 3 and VIII—VIII of FIGURE 6 illustrating an iris assembly in a closed position.
FIGURE 9 is a plan view of the iris assembly, shown in an open position.

As shown in FIGURES 8 and 9, the assembly 71 includes a stationary ring 73, positioned between the tube 60 and chute 72, and encircling the space between them. As shown, the stationary ring 73 has three upstanding, stationary guide pins 74, rigidly secured to it and located at spaced points around it. A rotatably mounted cam ring 75, surrounds the stationary ring 73 and, as shown, has three upstanding, retainer pins 76 rigidly secured to it and located at spaced points around it so as to correspond to the spacing of pins 74.

A separate iris plate 77 is pivotally mounted on each retainer pin 76. Each iris plate 77 has a slot 78 formed therein intermediate its ends and extending longitudinally thereof, midway between its lateral edges. Each such slot 78 receives a separate one of the guide pins 74. When the rotatable cam ring 75 is turned to an iris closing position as shown in FIGURE 8, the retainer pins 76 are moved by the ring to positions in alignment with the guide pins 74 and slots 78, thus shifting the iris plates 77 to the positions shown in FIGURE 8, with the points of the plates projecting into the pasageway between tube 60 and chute 72 which is surrounded by the ring 73. In these positions the plates 77 block the passage of caps 58 through this passageway, thereby causing the caps 58 moving down the chute 59 to pile up on one another. However, when the cam ring 75 is rotated to withdraw the plates 77 to the positions shown in FIGURE 9, and thus open the passageway, the piled up caps 58 move into and through the tube or chute 72.

A housing ring 79, having an opening 80, surrounds the cam ring 75. An actuating arm 75a, secured to the cam ring 75, projects outwardly through the slot 80 and is operatively connected to the plunger 82 of a solenoid 81 by a pivoted link 83. The ends of the slotted ring 79 limit the extent of the arcuate movement of the ring 75. The solenoid 81 is mounted on the blanking machine adjacent the iris assembly 71 and a spring 85, connected to the pivot pin 84 located between the arm 75a and link 83, is so mounted on the machine that it urges the cam ring 75 and, consequently, the iris plates 77 to a closed position, shown in FIGURE 8, when the solenoid 81 is de-energized.

The solenoid 81 is energized in timed relationship with the operation of the blanking machine 50, so that a predetermined number of caps 58 will be collected in the cap-receiving tube 60 before the iris assembly is opened and the stacked caps are allowed to fall into the guide chute 72.

As shown in FIGURES 3 and 4, the blanking machine 50 is operated by a motor 67, which is operatively connected to a driving wheel 86 by a sprocket and chain 90. Wheel 86 is mounted on a shaft which actuates the blanking dies through a crank 87, a connecting rod 88 and an eccentric 89.

The sprocket chain 90 also actuates a sprocket and chain assembly including sprocket 91, chain 92 and sprocket 93. Sprocket 93 is mounted on a power input shaft 94 of a reduction gear enclosed within a box 95 (FIGURES 3 and 4). The power delivery shaft 97 of the reduction gear has a cam 96 mounted on it. The cam 96 is therefore driven in timed relationship with the blanking machine 50.

As shown in FIGURE 4, the periphery of cam 96 is notched to provide a depression 98 therein which cooperates with a roller 99 in controlling the delivery of current to the solenoid 81. The roller 99 rides the periphery of the cam 96 and drops into the depression 98 during each rotation of the cam 96 and actuates a switch 100. The switch controls the delivery of curent to the solenoid 81 and therefore the operation of the iris assembly 71 in timed relationship with the operation of the blanking machine 50. After a predetermined number of formed caps 58 (approximately 16) has entered the cap-receiving tube 60, the solenoid operates to open the iris assembly and thus drop the collected pile of caps into the chute 72.

As shown in FIGURE 3, chute 72 is provided with a photo cell 101 located adjacent its upper end, and a photo cell 102 located near its lower end. Each cell is provided with an opposed light source which projects light across the chute 72 and onto the cell. The upper photo cell 101 actuates a relay (not shown) which operates to cut off operating current to motor 67 when the assembled caps 58 build up in the tube 72 to a height such that they intervene between the light source and the cell 101. Photo cell 101, however, is provided with a time delay, so as to permit the group of caps, periodically droped by the iris assembly 71, to pass through the light beam without stopping the motor 67.

The lower photo cell 102 is connected to a relay (not shown) which energizes the motor 67 when that photo cell is activated by its associated light source. That is to say, cell 102 is activated when its light source is unobstructed and the light beam passes therefrom across the chute 72. Accordingly, when the chute 72 is full of caps the upper photo cell 101 will be activated and shut down the motor 67, thereby stopping the blanking machine 50; however, when the chute 72 is emptied, the lower photo cell 102 will be activated to again deliver current to the motor 67 and start the blanking machine 50. Thus, the upper photo cell 101 functions as a safety cut-off to prevent an overflow of caps in the chute 72, whereas, photo cell 102 functions to automatically start the production of caps when the chute 72 is empty.

The magazine assembly 103 for collecting and stacking the caps 58, as shown in FIGURES 10 through 20, includes a threaded center post 104, a pair of vertically-spaced spacer discs 106, a plurality (twelve shown) of arcuately-spaced-apart stacking tubes 108, and a bottom plate 115. The center post 104 has a conically tapered bottom end 105 and a conically recessed upper end 105a. The tube spacer discs 106 are provided with a plurality of arcuately-spaced-apart bores 107 (FIGURE 12) for receiving and positioning the stacking tubes 108 arcuately about the center post 104. The tubes 108 may be secured to the spacer discs 106 by any suitable means, such as by a cemented joint 110. Each of the spacer discs 106 is provided with a pair of oppositely disposed, dish-shaped reinforcement rings 112. Spacer members 111 are positioned between the rings 112 and the discs 106 and surround the center post 104 with the reinforcement rings 112 tightly held in place against the spacer members 111 by means of nuts 113 threaded on the center post. The reinforcement rings 112 are utilized to provide added strength and rigidity to the spaces discs 106.

The bottom plate 115 has a re-entrant, supporting flange 116 which, as shown in FIGURES 10 and 17, may function as an annular supporting foot for the magazine. A similar plate 115′ forms a clamping guide for the upper end of the magazines as shown in FIGURE 17. A plurality of apertures 117 are formed through an upper portion of the bottom plate 115 in axial alignment with the lower ends of the cap-receiving tubes 108. A bottom reinforcement disc 118 is secured in spaced relationship to the bottom plate 115 by means of a center spacer 111 and securing nuts 113. As shown in FIGURE 20, the bottom reinforcement disc has a plurality of tabs or flange portions 119 extending downwardly from its outer periphery into abutting contact with the upper surface of the bottom plate 115.

As shown in FIGURES 10 and 13, a stop plate 120 having a center aperture 123 may be positioned between the lower end of the tubes 108 and the upper portion of the bottom plate 115. The stop plate 120 is rotatably mounted about the center post 104 and has an opening 121 which may be selectively alignable with the lower end of one or another of cap-receiving tubes 108. A handle portion 122 on the plate 120 is provided to rotate the plate and extends outwardly beyond the radial extent of the bottom plate 115.

When the magazine is positioned to receive caps from the blanking machine, as shown in FIGURE 3, the opening 121 is positioned between the tubes 108 to close their lower ends. However, when the magazine is delivering caps to the feed chute 145, as shown in FIGURE 17, the opening 121 is aligned with the tube 108 which is positioned over the chute 145, thus permitting caps to fall from that tube into the chute 145, while plate 120 closes off the remaining tubes.

As shown in FIGURES 3 and 17, each of the upper magazines, such as magazine **103*a*, 103*b* of the stacked magazines, are provided with a rotatable retainer plate 124 instead of stop plate 120. The retainer plate 124, as shown in FIGURE 18, has a center aperture 125 to receive the center post 104, and a plurality of circular openings 126 and oblong openings 127 which are alignable with apertures 117 and the lower ends of superimposed tubes 108. The oblong openings 127 extend radially-inwardly to receive the tabs 119 therethrough. The tabs 119 are of a lesser arcuate extent than the elongated openings 127, and permit the retainer plate 124 to be rotated so as to open or close the lower end of one of the tubes 108. An operating handle 128 projects outwardly from the retainer plate 124 to facilitate rotation of the plate. When the magazines 103*a*, 103*b*, etc., are in a cap-receiving position under the blanking machine, the openings 126 and 127 are off-centered with respect to the bores of the tubes 108, however, when the magazines are in a stacked-in feeding position above the feed chute 145, the openings 126 and 127** are positioned in axial alignment with the tubes to provide an open passage through the aligned tubes.

Each magazine assembly is provided with a removable or foldable handle assembly 129 (see FIGURE 10) to facilitate ease of transporting the magazine from the blanking machine 50 to a stacked position above the feed chute 145. However, only the magazines which are to be positioned directly over the feed chute 145, i.e., those at the bottom of the stacked magazines, are provided with a stop plate 120, whereas, each of the other magazines of the stack is preferably provided with a retainer plate 124.

As shown in FIGURE 3, a magazine receiving slide assembly 130 is provided beneath the discharge chute 72 of the blanking machine 50 to receive and position a magazine assembly under chute 72 and the slidable sleeve **72*a*. As shown in FIGURES 10, 14, 15, and 16, the slide assembly includes a base plate 131, a slide member 132 and gibs 134 and 135 which form a guideway 136 for the member 132. The base plate 131 is provided with a guideway 131*a* (FIGURE 10) for slidably receiving a handle portion 132*a* of the slide member 132. A recess 131*b* is formed in the base plate 131 to receive a spring tensioned detent 137 (FIGURE 10) carried by the slide member 132. The slide member 132 has a conical recess 133 to receive the conical end 105 of the center post 104 of the magazine assembly 103**.

A magazine 103, such as the one illustrated, is positioned on the magazine receiving slide assembly with the conical end portion 105 positioned within the conical recess 133. The slide 132 is then slid inwardly from the position shown in FIGURE 14 to the position shown in FIGURE 15, so that one of the cap-receiving tubes 108 carried by the magazine assembly will be slid under the guide chute 72 of the blanking machine 50. The sliding sleeve **72*a* is then positioned over the top of one of the cap-receiving tubes 108 to form a through connection between the chute 72 and a tube 108, so that the tube will receive caps 58 as they leave the guide chute 72. The stop plate 120 will close the bottoms of the tubes 108 or a retainer plate 124 at the bottom of the magazine will be so positioned that all the tubes 108 will be closed off and one will therefore collect the caps 58 as they issure from the chute 72**.

When one of the tubes 108 is filled with caps, the caps will continue to stack up within the chute 72 and cause the photo cell 101 to shut off current to the motor 67 and stop the blanking machine 50. The operator will then lift the sliding sleeve **72*a*, retaining the caps therein with his finger, and rotate the magazine 103 to position an empty tube 108 under the chute 72. The sleeve 72*a* is then positioned over the end of the empty tube 108, and the caps 58 within the chute 72 are allowed to drop into the tube for stacking. Accordingly, when the caps fall out of chute 72, the light source associated with the photo cell 102 will energize the drive motor 67 and start the blanking machine 50. When all of the tubes 108 of a magazine assembly have been filled with caps, the slide 132 (FIGURES 10, 14, 15) is moved outwardly, thus withdrawing the magazine 103, and an empty magazine is positioned on the slide 132 and moved to so position an empty magazine that an empty cap-receiving tube 108 is located below the guide chute 72**, (FIGURES 3 and 6).

The spring tensioned detent 137 is adapted to snap into recess **131*b* (FIGURE 10) when the slide 132 is moved inwardly from the position shown in FIGURE 14 to the position shown in FIGURE 15. Thus the magazine assembly is retained in correct position with relation to the chute 72 by the positioning and locking action of the detent 137 and the recess 131*b* formed in the base plate 131**.

Each filled magazine may be conveniently stored until required to deliver caps to containers. As shown in FIGURES 2 and 17, a plurality of magazines are stacked, one above the other in vertical alignment, over the feed chute 145. The conical end 105 of the center post 104 of the lower magazine 103 is positioned within a tapered hole 139 of a feed centering plate 138 and that plate has a feed opening 140 to receive an upper end of feed chute 145 (FIGURES 17 and 19). Apertures 141 for receiving bolts for securing the plate 138 to the floor 142 are also formed in the plate 138.

When magazines 103, **103*a*, and 103*b* are stacked as shown in FIGURES 2 and 17, the retainer plates 124 of magazines 103*a* and 103*b* are turned to open positions wherein the vertically aligned tubes 108 of the stacked magazines are in open communication with one another. That is to say, the handle 128 of the retainer plate 124 (FIGURE 17) will be turned to position the openings 126 and 127 of retainer plates 124, in alignment with the ends of the tubes 108, so that the caps 58 in the tubes 108** may readily fall through the aligned tubes.

The stop plate 120, provided with the lowermost magazines 103, is positioned so that its single opening 121 is in alignment with the vertically stacked tubes 108 which are oriented over the feed chute 145 (FIGURES 2 and 17). After one set of vertically-aligned tubes 108 of the stacked magazines 103, **103*a*, and 103*b*, is allowed to be completely emptied through the openings 121 of the stop plate 120 and into feed chute 145, the stack of magazines is rotated so that a full set of aligned tubes 108 is positioned over the feed chute 145. After the full set of aligned tubes 108 are positioned over the feed chute 145, the handle 122 of the stop plate 120 is rotated to position the single opening 121 of that plate over the feed chute 145 so as to allow the caps in the newly presented stacked tubes 108** to fall into the chute.

As shown in FIGURE 17, the conical end 105 of the center post 104 of the lowermost magazine 103, is pivotally mounted in the tapered hole 139 of the feed centering plate 138. The conical end 105 on the center post of each of the stacked magazines 103*a*, 103*b* is positioned in the conical recess 105*a* formed in the upper end of the center post of the next lower magazine. The re-entrant flange 116' of the base plate 115' of the upper magazines 103*a*, 103*b*, guidably engages the tubes 108 of the next lower magazine, and frictionally hold the stacked magazines together so that they may be rotated in unison. In addition, the interfitting conical connection between the ends of the center posts, together with the re-entrant, guide flange 116' facilitates stacking the magazines in vertical and operative alignment with one another.

The feed chute 145, as shown in FIGURES 1, 2, 21, and 22, extends downwardly from the stacked magazines on an elevated level, such as second floor 142, to a separator or dispensing device 155 positioned on a lower level, such as first floor 143 (FIGURE 2). As shown, the chute 145 includes a first substantially vertically-downwardly-projecting portion 145*a*, the upper end of which is secured within aperture 140 of the feed centering plate 138. A second downwardly-sloped portion 145*b* of the feed chute has an inclination of approximately 9 degrees to the horizontal, and the final downwardly-sloped portion 145*c*, which is connected to the dispensing device 155, has a greater inclination to the horizontal.

The chute 145 not only directs and feeds the caps 58 downwardly to the dispensing device 155, but also functions as a storage chute. That is, the chute 145 as shown, when full of caps, contains enough caps to feed the dispensing device for approximately three hours. Accordingly, if the blanking machine should break down, the dispensing and capping operation may be continued for approximately three hours during the repair of the blanking machine.

Figures 21, 22, 23, 24, 25:
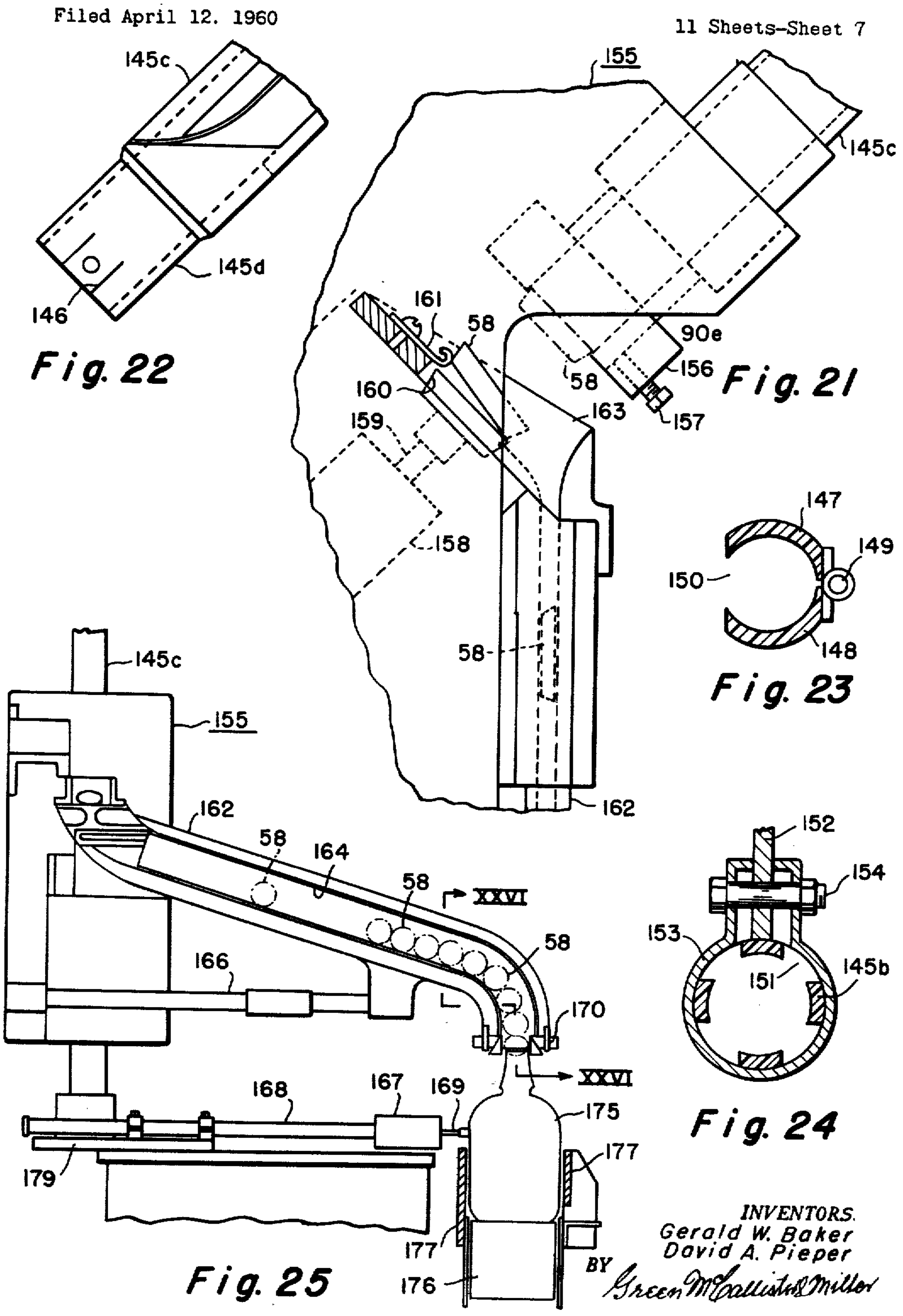
FIGURE 21 is a fragmental side view in elevation illustrating a portion of the dispensing device shown in FIGURE 2.
FIGURE 22 is a fragmental side view of the lower end of a feed chute leading to the dispensing device and shown in FIGURE 2.
FIGURE 23 is a section of the feed chute taken along lines XXIII—XXIII of FIGURE 2.
FIGURE 24 is a transverse section of the feed chute taken along lines XXIV—XXIV of FIGURE 2 and showing the hanger mechanism employed therewith.
FIGURE 25 is a side elevational view of a cap-dispensing chute which is employed in connection with the dispensing device.

As shown in the sectional view of FIGURE 23, the final downwardly-sloped portion 145*c* of the feed chute 145, has an upper cover member 147 pivotally mounted on a lower or track portion 148 by a hinge 149. An opening or slot 150 is provided between the free ends of the portions 147 and 148 to facilitate manually moving the caps toward the dispenser 155 should they become jammed within the chute. The hinged member 147 also provides an easy access to the portion 145*c* of the feed chute to remove jammed or deformed caps or reposition the caps in alignment with the chute. The portions 145*a* and 145*b* of the feed chute 145 are also provided with slots 151 to facilitate the manual movement of the caps along the feed chute if that is necessary.

As shown in FIGURES 2 and 24, an adjustable hanger 152 supports the feed chute 145 from the second floor 142. A clamp 153, suspended from the hanger 152 by a bolt and nut assembly 154, engages and supports the downwardly-sloped portion 145*b* of the feed chute 145.

The lower end of the chute 145 is reduced in outside diameter and the end portion 145*d* (FIGURE 22) has a plurality of longitudinal slits 146 formed therein to permit the end portion to be contracted and thus provide a restricted portion through which the caps must pass. As shown in FIGURES 21 and 22, the end portion 145*d* of the feed chute 145, is operatively connected to the dispensing device 155. A constricting band 156 having an adjusting screw 157 encompasses the slit end portion 145*d* and may be adjusted to contract the slit end and thereby adjust the lower end of the chute 145 to frictionally engage and retain the bottommost cap 58 and prevent it from freely falling out of the chute 145.

The dispensing device 155 is equipped with an air cylinder 158, having a piston rod 159 with a vacuum or suction cup 160 located on its outer end. A cap stripper finger 161 is so positioned adjacent the travel of the vacuum cup 160 that it removes from the cup each cap 58 adhering to and transported by the cup.

The air cylinder 158 is periodically activated, as hereinafter set forth, to reciprocate the plunger 159, and when the plunger 159 is in its extended position, the vacuum cup 160 will engage and adhere to the lowermost cap 58 in the chute which is frictionally engaged by and retained in the restricted end 145*d* of chute 145. As the plunger is retracted the suction cup 160 will withdraw the engaged cap 58 from the feed chute and as the plunger 159 is further retracted the cap 58 engaged by it will be stripped from the vacuum cup by coming into contact with the stripper finger 161. The cap thus released, falls into the enlarged funnel shaped upper end 163 of a dispensing chute 162, with which the dispenser 155 is equipped.

The function of the dispenser is to separate the caps 58 from one another, and singly deliver the separated caps through the chute 162. It is important, therefore, that the vacuum cup 160 remove only one cap at a time from the restricted end 145*d* of feed chute 145. The amount of restriction applied to each cap 58 must be limited to a light restraining force which will yieldingly hold the cap in the end portion 145*c* without deforming it upon its withdrawal from the chute 145. It is therefore necessary that the amount of restrictive force applied by the caps must be carefully controlled. By positioning the final downwardly-sloped portion 145*c* of the feed chute, at an angle of approximately 45 degrees to the horizontal, and by limiting its length to approximately two feet, we have found that an optimum working pressure of about 12 ounces will retain the lowermost cap 58 in the end portion 145*c* of the chute 145. The downwardly-sloped portion 145*b* is provided with a minimum angle so as to permit the caps to move downwardly by gravity, without effecting the downward pressure of the cap located in the final downwardly-sloped portion 145*c* of the chute 145.

Figures 26, 27, 28, 29, 30, 31:
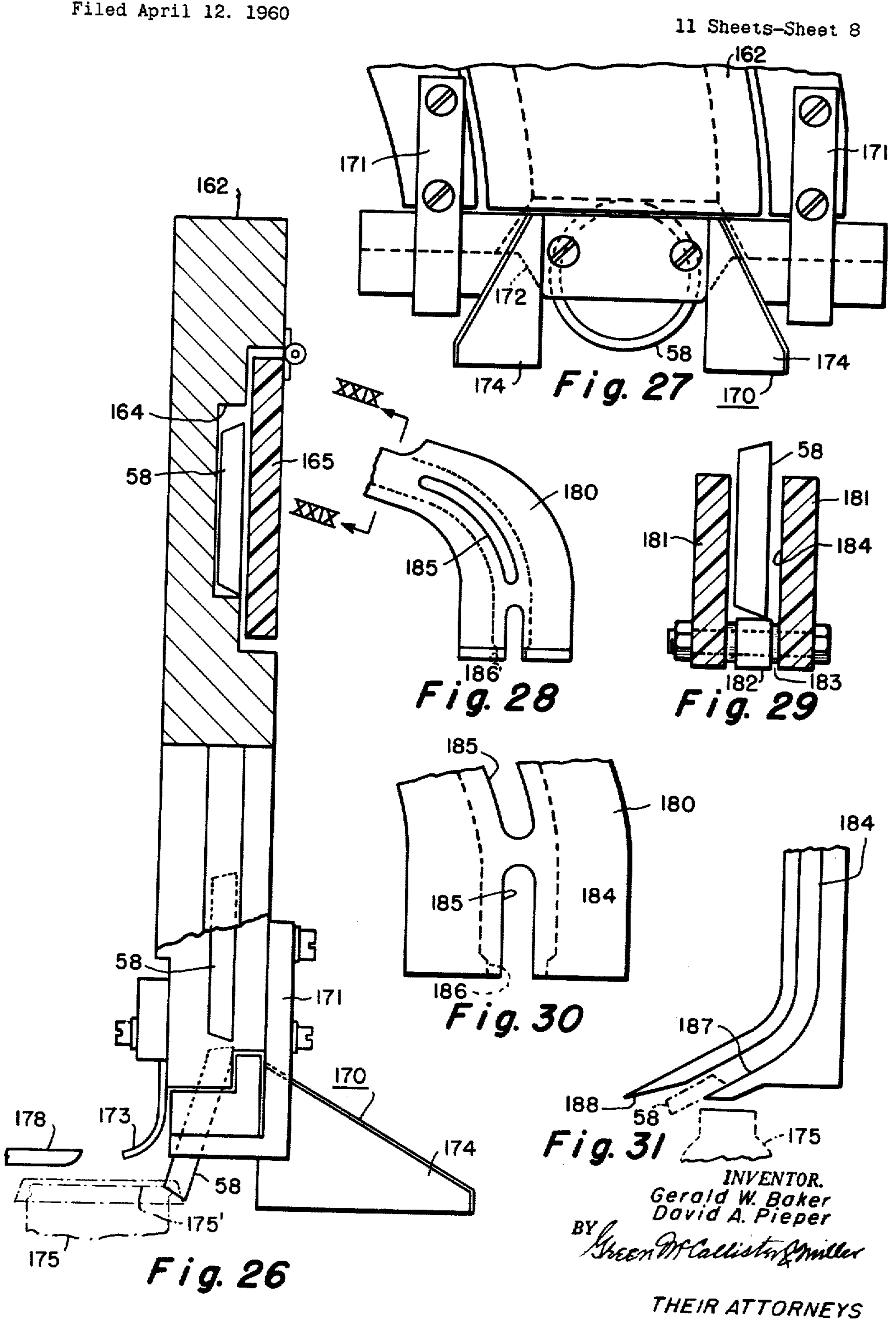
FIGURE 26 is a cross sectional view of the cap-dispensing chute taken along lines XXVI—XXVI of FIGURE 25.
FIGURE 27 is an enlarged fragmental view in elevation of the lower end portion of the dispensing chute shown in FIGURE 25.
FIGURE 28 is a fragmental side elevation of a modified form of dispensing chute which may be utilized with the dispensing device.
FIGURE 29 is an enlarged cross section of the modified form of dispensing chute taken along lines XXIX—XXIX of FIGURE 28.
FIGURE 30 is an enlarged fragmental view in elevation of the lower portion of the dispensing chute shown in FIGURE 28.
FIGURE 31 is an end view of the modified form of dispensing chute showing the delivery angle of a cap as it projects from the chute.

The dispensing chute 162, as shown in FIGURES 25 through 27, is provided with a narrow rectangular-shaped passageway 164 in which each formed cap 58 is separately supported on its flange edge as it moves downwardly toward and into the delivery end of the chute. The chute 162 is also provided with a hinged cover 165 (see FIGURE 26) which gives access to the interior of the passageway 164 in case the caps become jammed therein. A support arm or brace 166 extends from the frame of dispensing device 155 to the lower portion of the chute 162 and rigidly supports the chute in a position such that its lower end extends over a conveyor, such as conveyor 176 (FIGURES 1 and 25). The conveyor 176 is provided with a pair of guard rails 177 for guiding containers 175 along the path of the conveyor and past the delivery end of the chute 162 and a capping unit 190 to be later described.

A micro-switch 167, mounted on a support assembly 168 (FIGURE 25), is located adjacent the conveyor 176 for activating the air cylinder 158. A finger 169 included as a part of the micro-switch 167 projects over the conveyor 176 and is periodically contacted by the containers 175 moving along the conveyor, to thereby activate the micro-switch 167. The micro-switch, through an appropriate valve mechanism, not shown, actuates the air cylinder 158 (FIGURE 21) which in turn, actuates plunger 159 and vacuum cup 160 to engage and separate individual caps 58 from the end of feed chute 145, and deliver them one by one into the chute 162.

A dispenser guide assembly 170 (FIGURES 25, 26, and 27) is secured to the lower end of the chute 162 by brackets 171 (FIGURE 26). The dispenser assembly has a restricted portion 172 (FIGURE 27) which pendantly retains the lowermost cap 58 in chute 162. The restricted portion 172 has a maximum cap delivery opening which is slightly less than the diameter of the caps.

Accordingly, each cap 58 is frictionally engaged by the restricted portion and is yieldingly held in a position such that its edge extends slightly below the delivery end of the chute 162 as shown in FIGURE 25. The projecting flanged edge of the caps are thus positioned in the path of movement of the neck finish of the containers 175 as the containers are moved by the conveyor 176. A pair of converging centering wings 174 are positioned on the delivery end of the chute 162 so as to guide the neck finish of the containers 175 into contact with the projecting edge of a cap, as each container moves on and with the conveyor 176. That is to say, as the containers are conveyed past the dispenser chute the neck finish of each container 175 contacts a cap 58 and withdraws it from the restricted end 172 of the chute. As shown in FIGURE 26, a guide bar 173 guides the withdrawn cap and positions it loosely on the lip 175' of a container 175. A cover bar 178 (FIGURE 26) attached to the capping unit 190 by means of bracket 178a (FIGURE 32), extends between the dispensing device 155 and the capping unit 190 and is positioned to prevent the loosely positioned caps 58 from being blown off the containers 175 as they are conveyed toward the capping unit. The dispensing device 155 is positioned on a suitable support 179 (see FIGURE 25) which, as shown in FIGURES 1 and 2, may be secured to the capping unit 190.

A modified form of dispensing or delivery chute 180, which may be utilized with the dispensing device 155, is shown in FIGURES 28 through 31. The modified chute has a pair of oppositely disposed side members 181 and a bottom track member 182 so arranged as to form an open top passageway 184 (FIGURE 29). The track member is positioned between and in spatial relationship to the side members 181 so as to form an air gap 183 between it and the side members and thus permit dust and other foreign particles to fall out of the chute, leaving the caps 58 in a substantially unhampered condition in their movement through the chute. Further, it has been found that due to the light weight of the caps, they will not fall freely into a completely closed tube, apparently due to compression of air between the falling caps within the enclosed tube. The open top and the air gaps 183 of the modified form of chute 180 permit the caps to fall freely without encountering restraining air resistance within the open passageway 184.

Slots 185 are also formed in the side of the chute 180 to facilitate manual positioning of the cap within the chute if it is necessary. The bottom of the chute 180 has a restricted or narrow portion 186 (FIGURES 28 and 30) to frictionally retain the bottom-most cap with a portion of its flanged edge projecting downwardly below the end of the chute. As shown in FIGURE 31, the passageway 184 is provided with an angularly slanted portion 187 which retains the projecting cap at a slightly inclined angle to the horizontal as the forward edge of the cap moves beyond the end of the chute. As each container 175 is moved by, and with the conveyor 176, the neck finish thereof contacts the partially projecting and tilted cap 58 and extracts it from the narrowed end portion 186 of passageway 184. A slanting guide surface 188 guides the cap 58 during its descent, as it is extracted by the neck finish of container 175. This facilitates the placing of each cap 58 around the lip of a container 175 moving past the delivery end of the chute.

Figure 33:
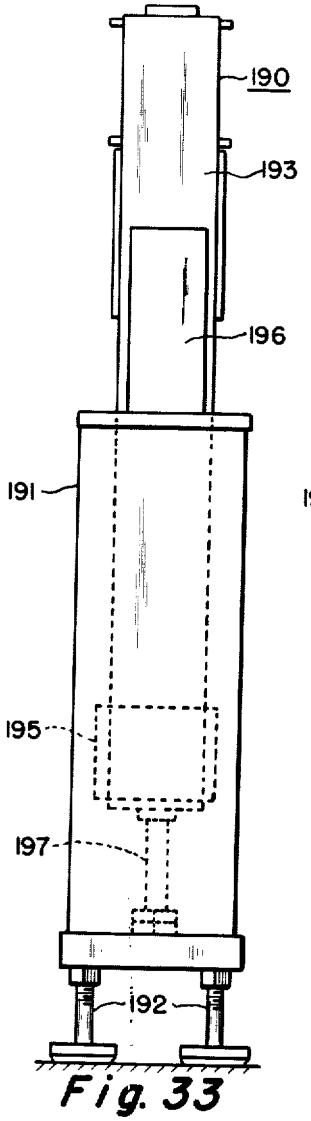
FIGURE 33 is an end view of the capper assembly shown in FIGURE 32.
Figure 32:
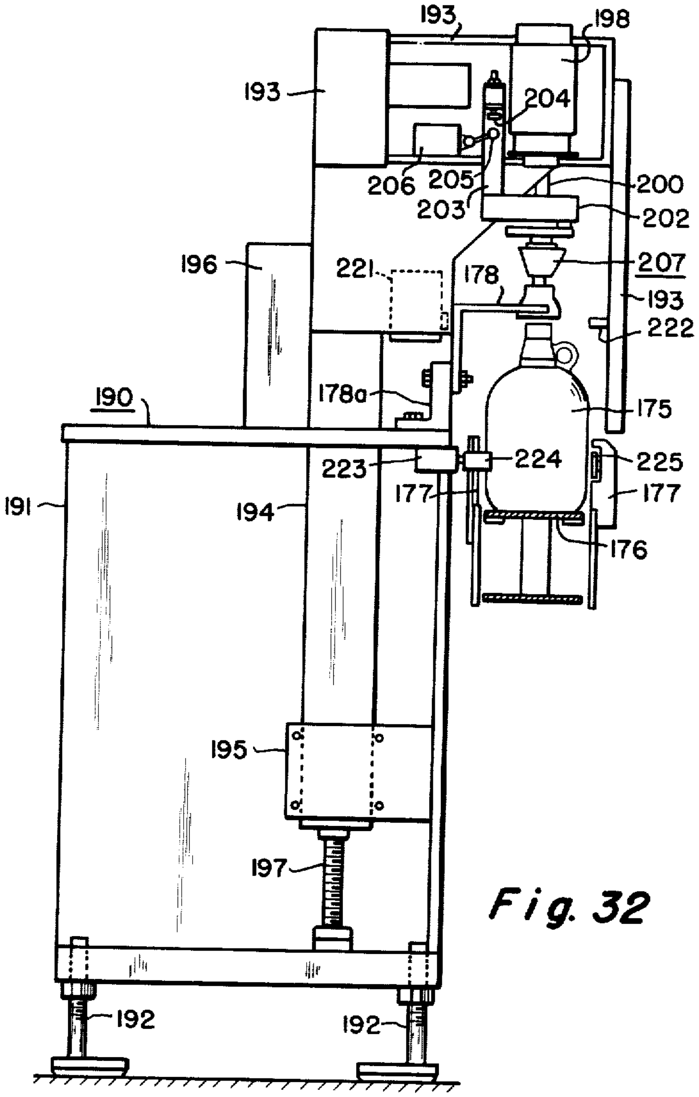
FIGURE 32 is a side elevational view of a capper assembly forming a part of the invention.

As shown in FIGURES 1 and 2, each container 175 after extracting a cap, moves along conveyor 176 from the dispensing chute 162 to the capping unit 190. As shown in FIGURES 33 and 32, the capping unit includes a housing 191 having adjustable feet 192. A vertically adjustable supporting frame 193, for supporting a capping head assembly, has an upright tube 194 slidable in a clamping guide 195, which is secured to the housing 191. A back-up block 196, positioned on the housing 191, provides a slide bearing surface for the upright tube 194. The supporting frame 193 is vertically adjustable by means of an adjusting screw 197 which engages the bottom portion of the upright tube 194.

Figures 34, 35, 36, 37, 37A:
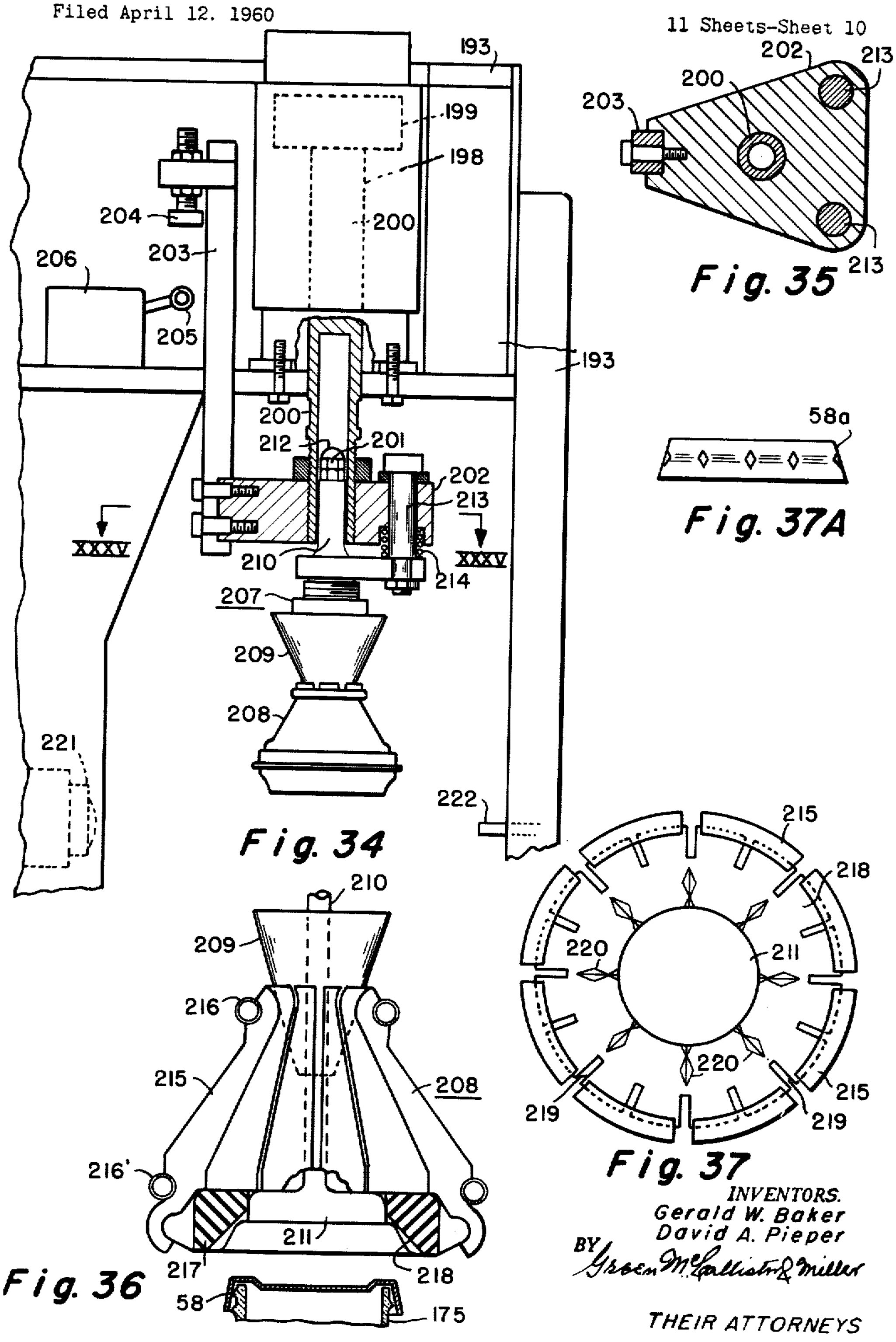
FIGURE 34 is an enlarged elevational view, partly in section, of a portion of the capper assembly forming a detail of the invention and shown in FIGURE 32.
FIGURE 35 is a cross sectional view taken along lines XXXV—XXXV of FIGURE 34.
FIGURE 36 is an enlarged elevational view, partly in section, of a capper head utilized with our invention and shown in connection with a section of a cap and a fragmental section of the mouth of a container.
FIGURE 37 is an enlarged bottom plan view illustrating a rubber diaphragm utilized with the capper head shown in FIGURE 36.
FIGURE 37A is a side elevation of a closure member as shaped and applied to a container.

As shown in FIGURES 32 and 34, the supporting frame 193 carries a capping cylinder 198 which includes a piston 199 equipped with a piston rod 200. The rod 200 extends through the support frame 193 and a capper support block 202 is secured to the lower threaded end portion 201 of the piston rod 200. An upright arm 203, secured to one side of the block 202, extends upwardly through the support frame 193 adjacent the capping cylinder 198. An adjustable contact 204 is secured to the upright arm 203 adjacent its upper end. The support frame 193 carries a limit switch 206 having an actuating arm 205. The arm 205 is positioned beneath and in the line of travel of the contact 204 and is adapted to be engaged by the contact 204 when the piston 199 and piston rod 200 move downwardly, as hereinafter described.

A head assembly 207, including a resilient diaphragm head 208 and a conical cam 209, is secured to the capper support block 202. As shown in FIGURE 36, a center shaft 210, having a cap-centering plunger 211 integrally formed at its lower end, projects downwardly through the conical cam 209 and diaphragm head 208. Cap and lock nuts 212, threaded on the upper end of center shaft 210, extend over the upper end of the head assembly 207 to pendantly support the center shaft.

The head assembly 207 is resiliently and adjustably supported from the cap or support block 202 by bolt and nut assemblies 213. A pair of springs 214, seated within recesses in block 202, resiliently urge the bolt and nut assemblies 213 downwardly and provide a spring cushioned lost motion between support block 202 and the capper head 208 when the head engages a container 175.

As best shown in FIGURES 36 and 37, the resilient diaphragm head 208 includes a plurality of pivotally mounted leaves 215, resiliently secured together at their upper and lower ends by annular springs 216 and 216'. A rubber diaphragm 217 is retained by the lower ends of leaves 215 and is located between them and the cap centering plunger 211. The diaphragm is annular and has a central, conical recess 218 which is adapted to encompass a cap 58, loosely positioned on the neck finish of a container 175, and thereby temporarily fix or seal the cap 58 to the container. The diaphragm 217 has a plurality of peripheral slots 219 and diamond-shaped slots 220 formed therein (FIGURE 37), which permit the diaphragm to yieldingly engage each cap 58 and press and shape it so that it is retained in a sealed relationship about the finish of a container. A cap 58a so shaped is shown in FIGURE 37A.

Figure 32A:
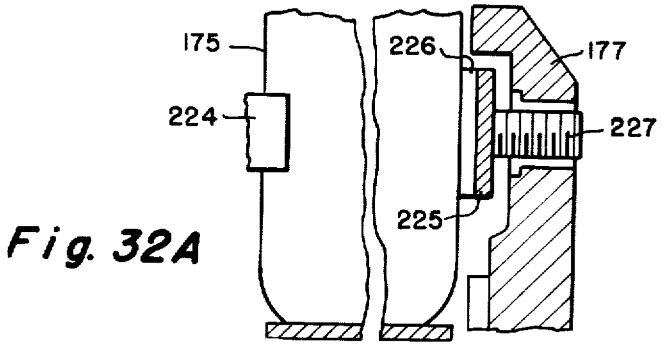
FIGURE 32A is an enlarged fragmental view of a portion of the capper assembly shown in FIGURE 32.

As shown in FIGURE 32, an electric eye 221 and a light source 222 are mounted in opposed relationship on the frame 193. The light source is directed across the path of containers 175 as they move on and with the conveyor 176 (FIGURE 1). A cylinder 223, having a clamping plunger 224, is positioned adjacent the conveyor 176 and beneath the head assembly 207, to momentarily arrest the movement of each container 175 as it moves along the conveyor (FIGURE 32). This permits the capping assembly to seal a cap on the momentarily stopped container. A yieldingly mounted back-up plate 225 is mounted on guide wall 177 of conveyor 176 opposite to the plunger 224 and cooperates therewith in stopping and positioning each container. The plate 225 is preferably provided with a yielding clamping surface 226. The position of the plate 225 may be adjusted by reason of its mounting bolt 227, clearly shown in FIGURE 32A.

As each container 175 is moved along the conveyor 176 it interrupts the passage of light from the source 222 to the electric eye 221. When the light beam is thus broken, the electric eye actuates a relay of an air valve solenoid (not shown) which in turn, activates the cylinder 223 and the clamping plunger 224 to hold the beaminterrupting container 175 stationary against the back-up plate 225. A split second later the capping cylinder 198 is activated to move the piston rod 200 downwardly and force the rubber diaphragm 217 of the clamping assembly 207 about the cap 58, loosely positioned on the then stationary container, and thereby crimp and fix the cap on the neck finish of that container. The upright arm 203 and contact member 204 (FIGURE 34) also move downwardly with the piston rod 200 and actuate arm 205 of limit switch 206 to reverse the delivery of compressed air to the cylinder 198 and thereby return the piston rod 200 and capping head assembly to their upper positions as shown in FIGURE 34. The movement of limit switch 206 also operates to cause the cylinder 223 to withdraw the clamping plunger 224 and permit the then capped container 175*a* to continue along conveyor 176 (see FIGURES 32, 34, and 36).

Figures 38, 39, 40, 41, 42:
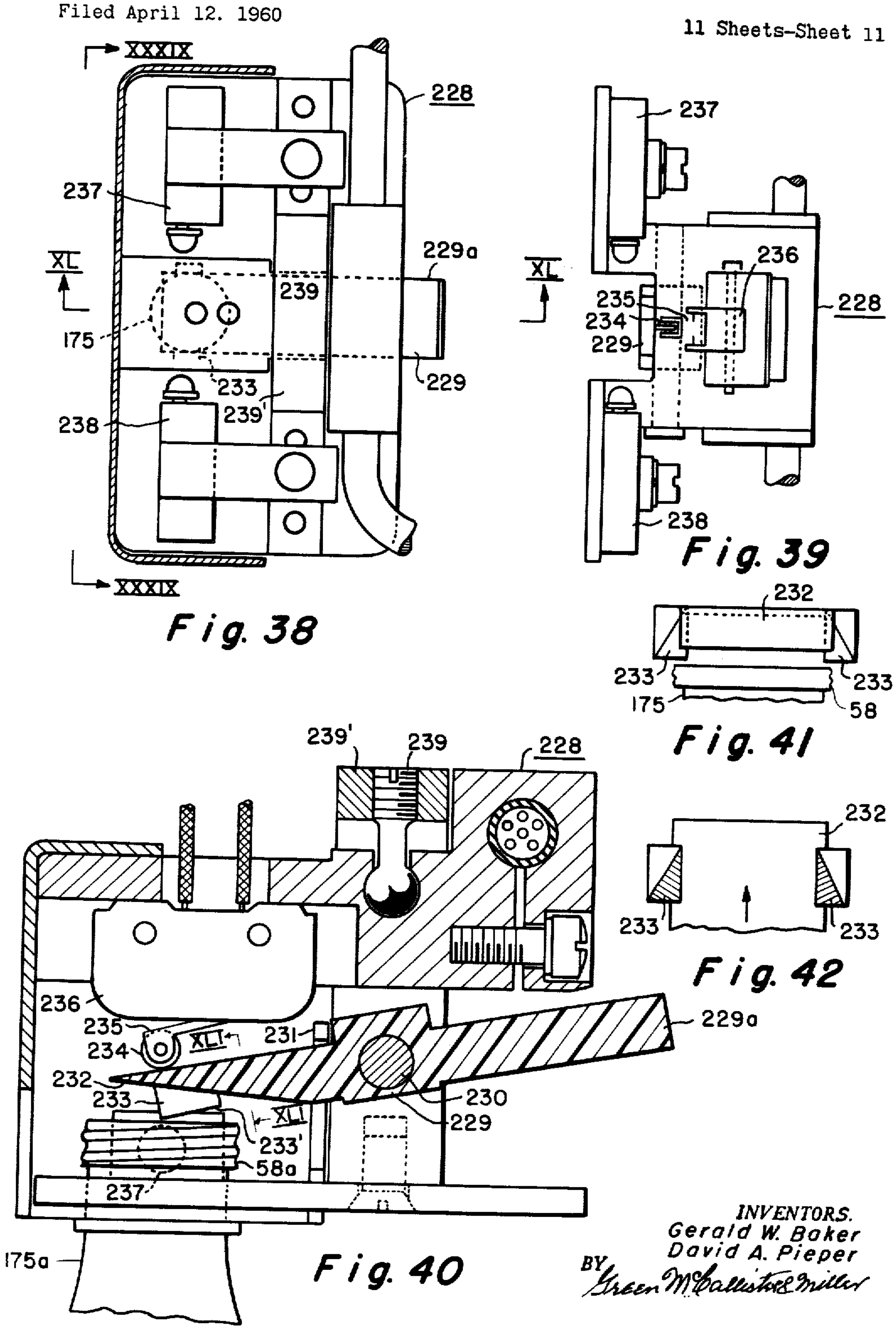
FIGURE 38 is a plan view of a detector mechanism utilized in connection with the capping apparatus herein illustrated.
FIGURE 39 is a front elevation of the detector device as viewed from the line XXXIX—XXXIX of FIGURE 38.
FIGURE 40 is a fragmental sectional view of the detector device taken along lines XL—XL of FIGURE 38, and shown in connection with a cap and a fragmental view of a capped container.
FIGURE 41 is a sectional view in elevation of a rocker arm taken along line XLI—XLI of FIGURE 40; and, FIGURE 42 is a fragmental plan view of an undersurface of the rocker arm.

The capped container 175*a* is then conveyor moved to an automatic cap inspection device 228 (FIGURES 1 and 38). As shown in FIGURES 38 through 42, the cap inspection device 228 includes a non-abrasive paddle 229 pivotally mounted at 230. A bar 231 (FIGURE 40) limits the tilting movement of the paddle. The forward end 232 of the paddle is sloped and carries a pair of spaced downwardly extending ears 233, the cam surfaces 233' of which are sloped upwardly and rearwardly. An electrical switch 236 is positioned above the forward end 232 of the paddle and has an outwardly urged pivot arm provided at its free end with a contact roller 234 which is shown resting on the upper surface of the paddle. The paddle is so counterbalanced by its rearward end 229*a* as to lightly retain its upper forward edge in contact with the roller 234.

A light source 237 and an oppositely positioned photo cell 238 are located on opposite sides of a conveyor 241 (FIGURE 1) along which the capped containers 175 move. As one such container enters the inspection device 228, the upwardly and rearwardly sloped surfaces of the cam ears 233 are engaged by edge portions of the upper surface of the cap carried by the container, and the forward end 232 of the paddle is moved upwardly. This shifts the depending arm 235 of the switch and closes the switch to thereby deliver current to the light source 237. If a container moving into and through the inspection device is not provided with a cap, the light source will pass through the container and activate the photo cell, which in turn will energize either an audible or visual indicator 240 (FIGURE 1). If, however, the container is provided with a properly located cap, the beam from the light source will be interrupted by the cap and accordingly the photo cell 238 will not be activated.

Screws 239 adjustably secure the cap inspection device 228 to a support structure 239' and are such that the device including the pivot arm 235 and roller 234, the switch 236 and paddle 229 may be positioned at different positions above the conveyor 241 so that it may be employed with containers of different height.

As shown in FIGURE 1, the containers 175 may be conveyed along a main conveyor 241, and deflected by deflector rail 243 onto a secondary conveyor 176. Both the dispensing chute 162 and the capper 190 may be positioned adjacent the secondary conveyor 176. After the containers 175 are capped, they may then be deflected by deflector rails 244 back to the main conveyor 241, where they pass through the cap inspection device 228. As shown, the conveyor 241 is provided with side guard rails 242 to guide the capped containers as they move along the conveyor to the boxing or packing department.

The main conveyor 241 may be a through conveyor leading from the discharge end of a lehr to a packing department. When containers are being produced which do not require capping, the deflection rails 243 and 244 are removed from the main conveyor 241 and the uncapped containers pass directly from the lehr to the packing department. Further, if all the ware produced by the manufacturer are to be capped, the use of conveyor 176 and deflection rails 243 and 244 may be omitted and the delivery chute 162 and capper 190 may be positioned over the main conveyor 241 and the secondary conveyor may be omitted.

Although we have set forth a preferred embodiment of our capping system, it will be apparent to those skilled in the art that various changes and modifications, additions and omissions may be made in both procedure and apparatus without departing from the spirit and scope of the invention as defined in the appended claims. However, it is apparently desirable to employ metallic foil in the production of the caps used as temporary closures and it is noted that satisfactory results have been obtained by the use of foil at least one-hundredth of an inch thick.

What we claim is:

1. Apparatus for forming and placing temporary closures on open top containers, including a blanking machine for forming such closures from electrical conducting material, insulating means for mounting a coil of such strip material on said blanking machine, an electric motor for operating said machine, an electric circuit for delivering operating current to said motor including said coil as a part thereof, and means for opening said circuit upon the depletion of said coil and thereby stopping said motor and the operation of said blanking machine.

2. Apparatus for forming and placing temporary closures on open-top containers, including a blanking machine for forming such closures from a strip of electrical conducting material, means for delivering said strip to said machine, and a safety cut-off device for stopping said machine upon the buckling of said strip as it moves toward and through said machine comprising, a recess portion formed at a point along the passage of said strip to said blanking machine, an electrical contact positioned within said recess portion, a second electrical contact positioned in said passage opposite said recess portion, a relay switch connected to said contacts, an electric motor for driving said blanking machine, an electrical circuit connecting said relay switch to said electric motor, and a source of low voltage current applied to the strip whereby if the strip should buckle in the machine, it will engage the contacts and energize the relay to de-energize the electric motor and stop the blanking machine.

3. Apparatus for forming closure members and applying same to open-top containers, including a blanking machine for forming said closure members from a strip of electric conducting material, an electric motor for operating said blanking machine, means for stopping said motor and said machine when said strip of conducting material is depleted, and separate means for stopping said motor and said machine upon the buckling of said strip as it moves toward said machine.

4. Apparatus for forming temporary closures and applying same to open-top containers, including a blanking machine for forming said closures, a chute for receiving closures as they are formed by said machine, a tube adjacent the delivery end of said chute for receiving the closure from said chute, an iris assembly adjacent the delivery end of said tube for blocking delivery from said tube and thereby collecting a predetermined number of closures within said tube, and means responsive to the operation of said blanking machine for activating said iris assembly and thereby permitting a predetermined number of closures collected thereon to be discharged in unison from said tube.

5. Apparatus for forming closures and applying same to open-top containers including a blanking machine for forming the closures from pliant material; means for guidably directing and controlling the flow of closures from said machine to a storage magazine, said means comprising a chute for collecting closures as they are formed by said machine; a receiving tube positioned beneath the delivery end of said chute, stop means below said tube for collecting a predetermined number of closures within said tube and periodically delivering them downwardly, a guide chute positioned beneath and axially aligned with said tube to guide the closures during their downward descent into a collecting tube of said storage magazine, and means operatively associated with said guide chute for stopping the operation of the blanking machine when said guide chute is filled with the closures.

6. Apparatus for forming closures and applying the same to open-top containers, including a blanking machine for forming the closures and a storage magazine; means for guidably directing and controlling the flow of closures from said machine to said storage magazine; said means having a chute for collecting closures as they are formed by said machine, a receiving means positioned beneath a delivery end of said chute, stop means cooperating with said receiving means for collecting a predetermined number of closures within said receiving means and periodically delivering them downwardly, a guide chute beneath and axially-aligned with said receiving means to guide the closure members during their downward descent into said storage magazine, and means operatively associated with said guide chute for stopping and starting the operation of said blanking machine respectively when said guide chute is empty of and filled with the closures.

7. In a capping system for supplying temporary closures to open-top containers, a blanking machine for forming the closures; means for guiding and controlling the delivery of closures from said machine to a storage magazine comprising, a chute for receiving the formed closures from said machine, a guide tube communicating with the lower end of the chute, and a collecting tube constituting a part of the storage magazine, means for stopping said blanking machine when said collecting tube is filled with closures and closures are stacked to a predetermined height in the guide tube, and means for starting said blanking machine when the stacked members are discharged from the guide tube.

8. In a capping system for providing open-top containers with temporary closures comprising a blanking machine for forming the closures from a strip of pliant material; a collecting device for receiving formed closures delivered by said machine, a magazine for receiving and storing the closures from the collecting device, and control means for controlling the operation of the blanking machine in response to the formation and collection of the closures comprising, means for stopping said blanking machine upon the depletion of said strip material, additional means for stopping said blanking machine upon a buckling of the strip material within said machine, stop means forming a part of said collecting device and being responsive to the operation of the blanking machine for periodically collecting and dispensing a plurality of closures, and means for stopping said blanking machine subsequent to the filling of a collecting tube forming a part of said storage magazine with closures.

9. In a capping system for supplying open-top containers with light-weight, temporary closures, a blanking machine; means for receiving the closures as they are formed by said blanking machine; said means comprising a chute for collecting closures formed by said machine, a tube positioned below the lower end of said chute to receive the closures from said chute, an iris assembly below said tube for stopping delivery of closures from said tube and for periodically permitting delivery of closures therefrom, said iris assembly comprising a stationary annular ring having a plurality of arcuately-spaced-apart retainer pins, a cam ring circumscribing said stationary ring, a plurality of arcuately-spaced-apart iris plates pivotally mounted on said cam ring and extending radially-inwardly thereof, a guide slot in each of said iris plates for receiving one of said guide pins, and means responsive to the number of closures supplied to said tube for rotating said cam ring to move said iris plates to and from a closed position.

10. In a capping system as defined in claim 8 wherein said means for rotating said cam ring comprises a cam disc driven synchronously with the operation of the blanking machine, a limit switch having a cam follower arm contacting said cam disc, and a solenoid activated by said limit switch upon the actuation of said limit switch by said cam disc.

11. In a capping system for providing open-top containers with temporary closures, a magazine assembly for storing a plurality of said closures comprising, a center post, a pair of vertically-spaced tube spacer discs secured to said post, a plurality of arcuately-spaced-apart storage tubes extending through said spacer discs, and a bottom plate secured to said center post adjacent a lower end thereof to provide a base support for said tubes.

12. In a capping system for providing open-top containers with temporary closures including a magazine for stacking and storing a plurality of such closures comprising, a bottom support plate, a center post secured to and extending vertically above said bottom plate, a plurality of vertically spaced spacer discs secured to said post, each of said spaced discs having a plurality of axially-aligned and arcuately-spaced apertures formed therein, a plurality of arcuately spaced closure stacking tubes positioned within and extending through axially-aligned apertures formed in opposed spacer discs, each said stacking tube having slotted portions to facilitate a manual manipulation of closures retained in said tubes.

13. In a magazine assembly as defined in claim 12 wherein said bottom plate is provided with a plurality of apertures each located in axial alignment with the apertures of said stacking tubes, and wherein disc means is positioned between the upper surface of said bottom plate and the lower end of said stacking tubes for selectively opening and closing the lower end of one or another of said stacking tubes.

14. In a magazine assembly as defined in claim 12, means for facilitating a stacking of one magazine assembly upon another comprising a conical recessed portion formed in the upper end of the center post of each said magazine assembly, a conical nose portion formed on the lower end of the center post of each said magazine assembly and adapted to be positioned within the conical recess of another magazine assembly, and a re-entrant flange portion on the bottom plate of said one magazine assembly adapted to frictionally engage side portions of the stacking tubes of said other magazine assembly upon which it may be positioned.

15. In a capping system for providing open top containers with temporary closure members, a blanking machine for forming the closures and a magazine for receiving and storing the closures formed by said blanking machine, a guide chute for receiving closures from said machine, a slide assembly for operatively positioning the magazine beneath a guide chute of said machine comprising, a base plate, a pair of gibs secured to said base plate and forming a slide guideway therebetween, a slide member slidably mounted on said base plate between said gibs, a recess in the upper surface of said slide member for receiving a center post of said magazine, and a spring pressed detent for engaging and retaining the slide member in an inward position with the magazine positioned in alignment with said guide chute.

16. In a capping system for providing open-top containers with closures, a blanking machine for forming the closures, a guide assembly for receiving and guiding the flow of closures formed by the blanking machine, a magazine assembly for receiving and storing the closures from the guide assembly, means for moving said magazine into and out of operable alignment with said guide assembly, and means associated with said guide assembly for collecting an aligned group of the closures and for delivering the aligned group in an aligned relation to said magazine.

17. In a capping system for providing open-top containers with temporary closures and having a separator and dispenser unit for separating individual closures from a plurality of stacked closures and delivering the separated closures to successively presented open-top containers, a dispensing chute having a discharge end positioned over the path of the successively presented containers, a guide dispenser assembly secured to the discharge end of said dispensing chute and having a restricted opening to frictionally engage and pendently retain the bottommost closures in said chute, said guide assembly having a pair of centering wings for guiding the successively presented containers into engagement with a pendently suspended closure so that the container will engage and remove the engaged closure from such restricted opening.

18. In a capping system having separator and dispensing means for separating individual closures from a plurality of nested closures and for individually delivering the separated closures, a dispensing chute receiving separate closures so delivered and for directing the individual closures downwardly into a pendently retained position in alignment with the path of travel of the successively presented containers, said chute having a pair of side members and a track member positioned spatially therebetween so as to provide air gaps between the track member and the adjacent side members, a lower end portion of said chute being inclined to the horizontal, and having a restricted discharge portion for pendently retaining the lowermost closure in an inclined position in the path of successively presented containers to be engaged by the neck finish of a presented container.

19. In apparatus for forming temporary closure caps and securing one such cap to the neck finish of each of a number of successively presented open-top containers, a capping unit for pressure fixing one such cap on the neck finish of each such container, comprising a capping head assembly, means for moving a succession of containers up to said capping unit, an electric eye responsive in operation to the positioning of each such container for actuating said capping head assembly to pressure fix a loosely positioned cap onto the neck finish of each such container, and limit switch means actuated by said capping head assembly for limiting the downward movement thereof and for returning said assembly to its upper position.

20. In apparatus as defined in claim 19, clamping means for positioning and temporarily retaining each successively presented container in vertical alignment with said capping head assembly, and said electric eye means energizing said clamping means before actuating said head assembly to move downwardly, and said limit switch means de-energizing said clamping means.

21. In apparatus as defined in claim 19 wherein resilient lost motion mounting means operatively connects said capping head assembly to said capping unit.

22. In apparatus providing open-top containers with closure caps, an inspection device for indicating by an alarm the absence of a closure cap from one of a plurality of successively presented containers, comprising, electric eye means, mechanism for energizing said electric eye means upon the presentation of each of said successively presented containers, and means responsive to said electric eye means for indicating the absence of a closure cap from a presented container.

23. Apparatus for forming and placing temporary closures on open top containers, including a blanking machine for forming such closures from electrical conducting material; insulating means for mounting a coil of such material adjacent said blanking machine; an electric motor for operating said machine and delivering said material thereto; an electric circuit for delivering operating current to said motor, said circuit including said coil of material as a part thereof; and means for opening said circuit upon depletion of said coil and thereby stopping said motor and the operation of said machine.

24. Apparatus for forming and mounting a formal temporary closure on each of a succession of open top containers, including a closure-forming machine, a magazine for receiving formed closures delivered by said machine; a closure-dispensing device for dispensing closures from said magazine; an open ended closure-delivery chute forming a part of said device; a capping unit located adjacent said device; means for moving a succession of open top containers past the lower open end of said chute in engaging and removing relationship with a closure projecting from the lower open end of said chute; means for momentarily engaging and separately retaining each such container under said capping unit; and means for simultaneously actuating said capping unit to pressure crimp the so removed closure into engaging contact with the neck finish of the closure supporting container.

25. Procedure for protecting from contamination the interior surfaces of newly formed containers which comprises, providing flanged caps; successively delivering caps so formed to a delivery chute having an open lower end and stacking the caps in progression along such chute; retaining the lowermost cap located in such chute projecting from the open lower end of such chute; moving each of a series of open top containers in succession past the lower end of such chute; causing the neck finish of each such container, while the container is moving, to engage and withdraw a projecting cap from such chute; then temporarily arresting the movement of each such container, and then pressure crimping the flange of the cap carried by the then stationary container into holding engagement with the neck finish of such container.

26. Procedure for temporarily capping open top containers which comprises, separately forming a succession of flanged caps from flat flexible material; stacking the caps so formed in nested relationship; succesively separating individual caps from such a stock of such caps; separately and successively suspending each cap so separated in an edgewise inverted position; then so moving a series of open top containers that the neck finish of each such moving container moves into removing engagement with a cap so suspended; and then pressing the flange of each cap so removed into holding contact with the neck finish of the supporting container.

27. Procedure for temporarily capping open top containers which includes forming flanged caps from pliant material; stacking caps so formed in nested relationship; successively separating individual caps from a stack of such caps; successively delivering caps so separated to an open ended downwardly inclined chute; successively retaining the then lowermost cap in said chute projecting from the open lower end of such chute; moving each of a series of open top containers past the lower end of said chute; causing the neck finish of each such container, while moving, to engage and withdraw a cap from the lower end of said chute; and then pressure crimping the flange of each cap so withdrawn into holding engagement with the neck finish of the then cap-supporting container.

28. Apparatus for forming closure caps and for capping open top containers, including means for forming a succession of flanged closure caps from pliant material; means for stacking caps so formed in nested relationship; a cap-dispensing tube; means for removing separate caps from such a stack of caps; means for delivering a succession of caps so separated to a dispensing tube; means for successively withdrawing separate caps from said tube and locating each cap so withdrawn on the neck finish of a separate container; and means for crimping the flanged edge of each cap so withdrawn into holding engagement with the neck finish engaged by such cap.

29. Apparatus for forming and delivering closure caps, including a machine for forming caps; a cap-receiving tube; an iris diaphragm for controlling the delivery of caps from said machine to said tube; and cam-actuated means for controlling the operation of said iris diaphragm.

30. Apparatus for forming closure caps, including a cap-forming machine; a delivery tube for receiving caps from said machine; an iris diaphragm responsive to the operation of said machine for periodically delivering caps from said machine to said tube; and a photo cell responsive in operation to caps located within said tube for controlling the operation of said machine.

31. Apparatus for forming closure caps including a cap-forming machine; a cap-receiving tube for receiving caps formed by said machine; means responsive to the operation of said machine for controlling delivery of caps from said machine to said tube; and a photo cell responsive in operation to the number of caps within said tube for controlling the operation of said machine.

32. In combination with a capping unit for applying caps to open containers, an inspection device including a container-engaging paddle, a light source, a photo cell spaced from and energized by said light source, a conveyor for moving individual containers in succession past said unit and then between said light source and said photo cell; and container-engaging means for delivering electric current to said light source, said means being located between said unit and said light source.

33. In combination with a capping unit for applying caps to open containers, an inspection device including a container-engaging device, a light source, a photo cell spaced from and energized by said light source, a conveyor for moving individual containers past said unit and then between said light source and said photo cell; a switch for delivering electric current to said light source; and a container-engaging means located between said unit and said source for actuating said switch to deliver current to said light source.

34. A combination of elements as set forth in claim 33, in which said container-engaging means consists of a pivoted paddle having a surface located at one end thereof and extending into the path of travel of the neck finish of a container moved by said conveyor.

References Cited in the file of this patent

UNITED STATES PATENTS

| | | |
|---|---|---|
| 1,931,435 | Davis et al. | Oct. 17, 1933 |
| 2,053,763 | Brinton | Sept. 8, 1936 |
| 2,056,120 | Brinton | Sept. 29, 1936 |
| 2,522,438 | Enock | Sept. 12, 1950 |
| 2,579,404 | Stevenson | Dec. 18, 1951 |
| 2,599,820 | Ford | June 10, 1952 |

FOREIGN PATENTS

| | | |
|---|---|---|
| 686,600 | Great Britain | Jan. 28, 1953 |

UNITED STATES PATENT OFFICE

CERTIFICATE OF CORRECTION

Patent No. 3,092,941 June 11, 1963

Gerald W. Baker et al.

It is hereby certified that error appears in the above numbered patent requiring correction and that the said Letters Patent should read as corrected below.

Column 6, line 27, for "droped" read -- dropped --; line 65, for "spaces" read -- spacer --; column 8, line 13, for "issure" read -- issue --; column 16, line 3, for the claim reference numeral "8" read -- 9 --; column 18, line 36, for "stock" read -- stack --.

Signed and sealed this 7th day of January 1964.

(SEAL)
Attest:

ERNEST W. SWIDER

Attesting Officer

EDWIN L. REYNOLDS

Acting Commissioner of Patents